United States Patent [19]

Gladstone

[11] 3,815,427
[45] June 11, 1974

[54] ACCELEROMETER
[75] Inventor: Robert Gladstone, Weybridge, England
[73] Assignee: Olympus Optical Company Limited, Tokyo, Japan
[22] Filed: June 13, 1972
[21] Appl. No.: 262,262

[30] Foreign Application Priority Data
June 24, 1971 Japan .......................... 46-45236
Feb. 10, 1972 Japan .......................... 47-16900

[52] U.S. Cl. ................................. 73/493, 73/514
[51] Int. Cl. ...................................... G01p 15/02
[58] Field of Search ................. 73/493, 514, 515; 116/129 A, 129 B

[56] References Cited
UNITED STATES PATENTS

| | | | |
|---|---|---|---|
| 404,947 | 6/1889 | Arnold | 73/515 X |
| 925,814 | 6/1909 | Jones | 116/129 B |
| 1,523,302 | 1/1925 | Spiro | 73/514 X |
| 1,945,456 | 1/1934 | Wardenburg | 116/129 B |
| 2,210,970 | 8/1940 | Bonell | 73/517 R X |
| 2,223,647 | 12/1940 | Stumpf | 73/493 X |
| 2,543,722 | 2/1951 | Hetzel | 73/493 X |
| 2,926,898 | 3/1960 | Taylor | 73/514 X |
| 2,945,379 | 7/1960 | Barnes et al. | 73/517 R |
| 3,561,272 | 2/1971 | Davis | 73/493 X |

Primary Examiner—James J. Gill
Attorney, Agent, or Firm—Silverman & Cass

[57] ABSTRACT

An accelerometer for providing direct measurement of the velocity of the head of a golf club by attaching to the shaft of the golf club the accelerometer comprising an inertia mass in its chassis supported by spring means for movement relative to and parallel to the gold club shaft when the club is swung. The deviation of the inertia mass is indicated by an indicating means able to give a stational and definite indication.

4 Claims, 6 Drawing Figures

PATENTED JUN 11 1974 3,815,427
FIG. 1.
FIG. 2.
FIG. 3.
FIG. 4.
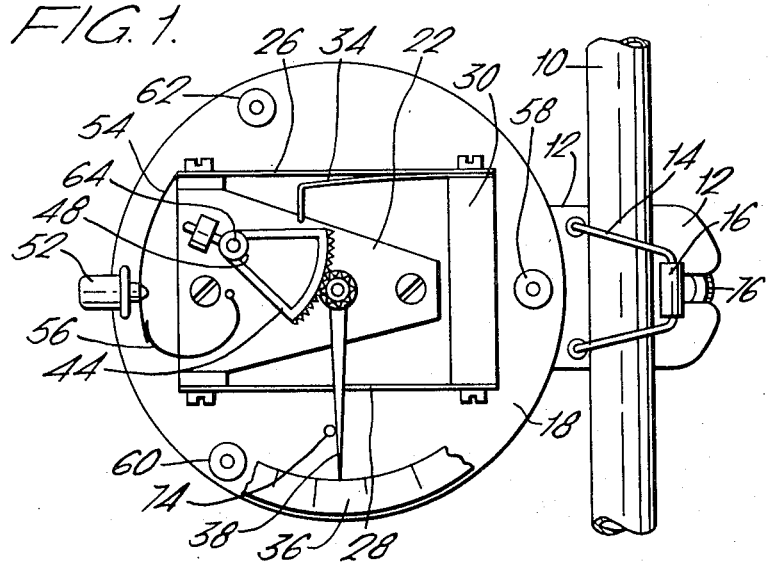
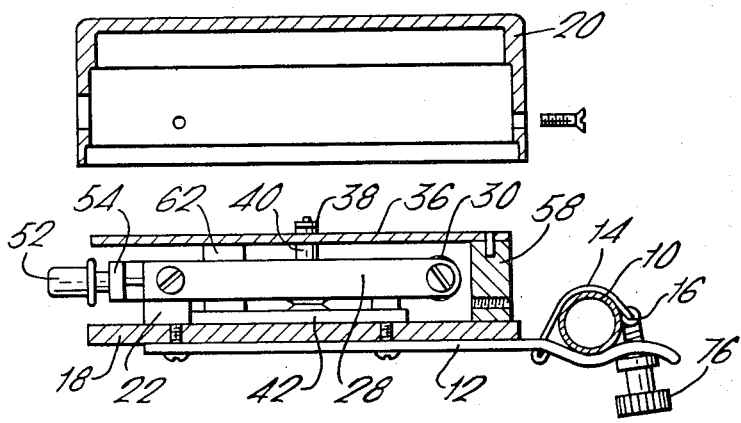
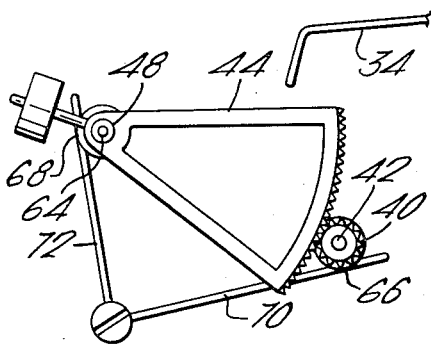
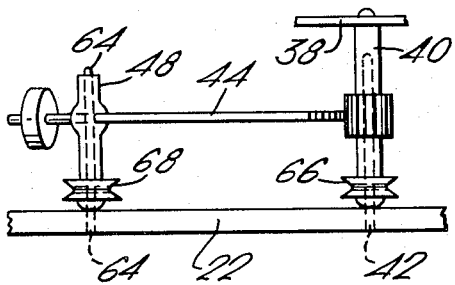

3,815,427

ACCELEROMETER

BACKGROUND OF THE INVENTION

1. Field of the Invention

The present invention relates to an accelerometer for the direct measurement of the velocity of the head of a golf club. The accelerometer providing a player with a portable means by which by swinging his own particular club he can be given a measure of the force with which a golf ball would have been struck, this being related to the distance the ball would have travel had it been so struck.

2. Description of the Prior Art

The maximizing of the distance travelled by a struck ball being one usual objective of a player when learning or practising the swinging of a golf club.

Such measurement is at present unavailable to a player other than by the use of elaborate, non-portable equipment, or by the player swinging a special club unsuited for use in actual play and not necessarily suited to any particular player the equipment or special club indicating only whether any swing was stronger or weaker than some predetermined strength.

In order to achieve useful striking velocities with the limited power available in the human body it is necessary to swing the head of a golf club through a substantial arc around the body. The club head will therefore develop an acceleration towards its center of rotation and will suffer centrifugal force inversely related to the radius of its arc at any moment and proportional to its weight and to the square of its velocity. When a ball is struck by the club head, the distance the ball will travel is related to the design of the club head, in particular its angle of list, and to some power of the velocity of the club head when the ball is struck. Part of the game of golf requires that the ball should be propelled as far as possible with a single stroke, and in practising such strokes it is usual for a player to strike a plurality of balls one by one in an open space, making the best estimate he can of distance travelled and the effectiveness of one method of striking compared with another.

SUMMARY OF THE INVENTION

According to this invention there is provided an accelerometer for the direct measurement of the velocity of the head of a golf club. The principal object of the present invention is to provide a player with portable accelerometer by which by swinging his own particular club he may be given a measure of the force with which a golf ball would have been struck, this being related to the distance said ball would have travelled had it been struck.

In order to achieve useful striking velocities with the limited power available in the human body it is necessary to swing the club head through a substantial arc around the body. The club head will therefore develop an acceleration towards its center of rotation and will suffer centrifugal force inversely related to the radius of its arc at any moment and proportional to its weight and to the square of its velocity. If a ball is struck by the club head, taking air resistance into account, the distance it will travel is related to the design of the club head, in particular its angle of lift, and to some power of the striking velocity. Part of the game of golf requires that the ball should be propelled as far as possible with a single stroke, and in practising such strokes it is usual for a player to take many balls with him to a secluded and extensive area where he may strike them one by one, making the best estimate he can of distances travelled and the effectiveness of one method of striking compared with another. As an alternative the player might swing his club in front of some elaborate electronic device that would indicate to him the club head striking velocity thus allowing practice to take place in confined space or even indoors with the advantage that precise measurement of different modes of swing would be obtained.

The present invention relates to a direct reading accelerometer being suitable for attachment to any golf club with which practise is desired, capable of measuring with all required precision the striking force developed when swinging the club. No limitation is implied as to presently known means used for measuring the acceleration subject to the overall weight and bulk of an instrument being small enough that the handling and swinging of any club is not objectionably affected. The accelerometer to be described essentially fulfils this requirement and all other requirements hereinafter defined.

Since the radius of the club head arc of swing will vary somewhat from player to player according to his stature and to the length of club in use and because it will be inconvenient and sometimes impossible to mount said accelerometer actually at the head of a club, and in any other position the acceleration measured will have no firm relationship to that developed at the head itself, it is possible for club head velocity to vary to some extent although the measured acceleration may remain the same. On this account it is not possible to rely absolutely on any scaling to give a true measure of club head velocity even though acceleration at the accelerometer itself may be correctly measured. However, since notional distance travelled by a ball bears some fractional power relation to club head velocity which in turn is related to the square root of the measured acceleration, error from this cause is comparativly small. In practice it is small compared with the random variation for any one player practising under varying conditions. In the game of golf the distance travelled by a ball as the result of identical strokes is extremely variable being dependent on chance and the state of the terrain and its form, the wind, temperature and barometer. It is therefore of major importance only that for any one player and any one club that said accelerometer should reliably show whether any one swing would have set a ball in motion more or less rapidly than another swing. For any one player and any one club there may only be one set of practical conditions for which a scale of notional yardage would closely approximate the truth.

The requirements for said accelerometer likely to be demanded by an experienced golfers or teacher are conceived to be 1. It shall be readily attachable to any club with which practise is desired, and readily re-attached to any other club at will.
2. Its weight and air resistance shall be so small that any club to which it is attached shall not feel unduly strange to the user.
3. A clear indication shall be retained on some indicating scale after a swing has been made, said indication not being easily altered by subsequent handling of the club, and providing a meaningful measure of the effect said swing would have had if a ball had been struck.
4. The sensitivity of said accelerometer should be such as to indicate reliably for any one user between one stroke and another any difference that would in practice result in a gain or loss of two or three yards in the distance that a ball would have been propelled in average conditions.
5. The indicating dial should cover a range at the lower end measuring the performance of beginners, and at the upper end the performance of the longest hitting experts. The scale must be easily read and mentally subdivisible down to one or two yards, or the equivalent in other terms.
6. Since the club in course of being swung may accidentally come in violent contact with the ground or some other object, said accelerometer must be able to withstand such impacts up to a point where the club itself would suffer damage.
7. The indicator must be readily reset to the scale minimum.
8. The accelerometer should be of simple construction and low cost if it is to be of wide interest.

BRIEF DESCRIPTION OF THE DRAWINGS

FIG. 1 shows a plan view of the accelerometer attached to the shaft of a golf club. The cover is omitted in this figure, and only a small part of the scale is shown for clarity;
FIG. 2 shows an elevation, with the cover present but lifted off its supports for clarity;
FIG. 3 shows a plan of the pointer mechanism complete;
FIG. 4 shows an elevation of the pointer mechanism, in which springs are omitted for clarity.

DESCRIPTION OF PREFERRED EMBODIMENT

Figure 5:
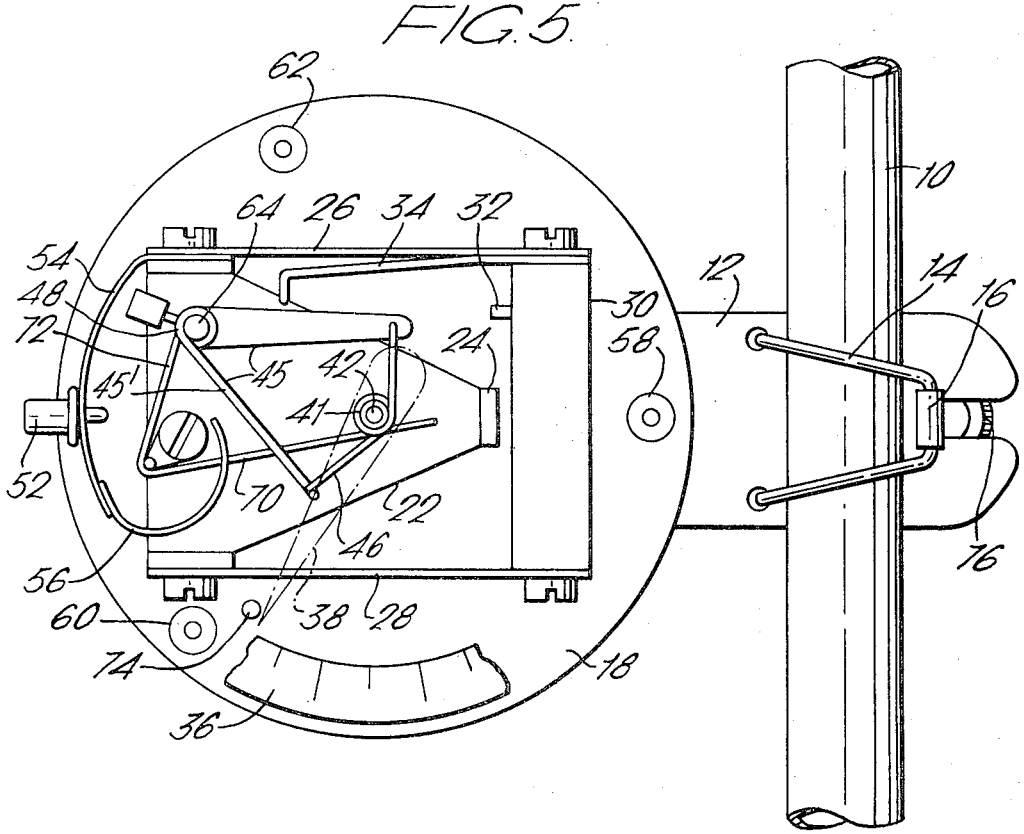
FIG. 5 shows a plan view of a modified embodiment of the accelerometer attached to the shaft of a golf club.

As shown in FIG. 1 the accelerometer is attached to any club shaft 10 by a rigid duralumin strip 12 bent at one end into the form of a shallow vee adapted to receive and locate at right angles to itself various thicknesses of club shaft 10 to which the accelerometer may have to be attached.

A continuous spring wire strap 14 is looped through holes at the inner side of the vee, curved across the club shaft 10 and looped through the tee shaped head of a screwed rod 16 that passes through a slot at the outer side of the vee, holding shaft 10 firmly into the vee when hand nut 76 is tightened at the back. The outer edge of strip 12 is curved backwards as shown in FIG. 2 so that tightening of nut 76 will draw the head of rod 16 close against shaft 10 thus preventing rotation of rod 16 when nut 76 is turned. Strap 14 may be freed from shaft 10 without removing nut 76 from rod 16.

On strip 12 is mounted a round perspex base 18 adapted to carry a perspex cover 20 shown in FIG. 2. The accelerometer proper is assembled on a chassis 22 which is bolted or riveted to strip 12 the bolts or rivets passing through and firmly holding base 18 between chassis 22 and strip 12.

Chassis 22 is adapted to carry two parallel flat spring strips 26 and 28 bolted or riveted to it at one end of each strip. The opposite ends of springs 26 and 28 are bolted or riveted to a rod 30 that forms the major mass responsive to an acceleration in the direction of its length. Mass 30 is constricted by springs 26 and 28 to a parallel motion in which as movement increases there builds up a rapidly increasing restoring force provided by springs 26 and 28. Centrifugal force acting on mass 30 as a result of acceleration when mounted on a swinging golf club will vary as the square of the velocity of the accelerometer, but the rapidly rising restoring force will tend to linearise displacement of the mass 30 with velocity and thus tend to equalise scale steps which will usually be required to relate more or less directly to club head velocity.

Mass 30 is fitted with a semi-rigid arm 34 to transfer its motion directly to a pointer mechanism, the free end of arm 34 being smooth and polished.

The pointer 38 is adapted to travel round the greater part of a circular scale 36, a small scrap of which is indicated in FIG. 1 for the sake of clarity. Scale 36 is seen in full edgewise in FIG. 2. A pointer stop 74 is fitted to scale 36 at the lowest scale reading likely to be of interest to any user, no calibration (other than for the point of zero acceleration) being marked below this point. Scale 36 may be calibrated upwards until stop 74 is reached, thus making available the maximum length of scale for calibrations that are of interest.

Pointer 38 is carefully balanced so that it will be unaffected by any unidirectional force. Pointer 38 is carried on a pinion sleeve 40 rotating freely on pillar 42 force fitted into chassis 22 at dial center. To the side of sleeve 40 remote from mass 30 is pivoted on pillar 64 a gear sector 44 carried on sleeve 48. The centers of pillars 42 and 64 permit meshing of gear sector 44 with pinion 40. The side of sector 44 on which arm 34 will bear when it moves downwards under an acceleration is smooth and polished. Sector 44 is carefully balanced against unidirectional forces.

Semi-rigid arm 34 is so bent that when mass 30 moves downward under acceleration, or under a test load, the polished end of arm 34 will come in contact with the polished edge of sector 44 causing sector 44 to rotate on pillar 64. The diameter of pinion 40 is chosen so that movement of sector 44 resulting from a movement of mass 30 of a magnitude determined by the difference between the greatest acceleration to be measured, and the least that it is desired to show on scale 36, shall turn pointer 38 almost a whole revolution when arm 34 has come in first contact with sector 44 at such a point that by bending arm 34 this point may be moved nearer or farther from pillar 64. When pointer 38 lies against stop 74 a gap will exist between arm 34 and sector 44. This gap represents the movement of mass 30 when the minimum calibration load is imposed. It will be convenient to make some mark on scale 36 at the position where pointer 38 rests when sector 44 is in contact with arm 34 under static conditions. In order to make any subsequent check of calibration, pointer 38 may be lifted over stop 74 in order, if necessary, to reset it on its sleeve 40 to true zero. It may then be lifted back to the operating side of stop 74. Alternatively to resetting pointer 38, arm 34 may be sent upward or downward to bring pointer 38 to the original zero mark. By bending the polished end of arm 34 to side to side, but maintaining a true zero point, movement of pointer 38 may be increased or decreased to a limited extent for any given movement of mass 30 so that movement of pointer 38 may be made to match a correctly calibrated scale. Production variation in mass 30 and springs 26 and 28 may be compensated by this means.

Over chassis 22 on stools 58, 60 and 62 attached to base 18 is mounted the circular scale 36 over which pointer 38 travels. Scale 36 is pegged to one of the stools to prevent rotation, and it is held concentric with pointer 38 and prevented from rising up by a close fitting rebate seen in cover 20 shown in FIG. 2. Cover 20 fits closely over all, and may be attached to base 18 by transverse bolts passing into stools 58, 60 and 62.

Projecting through the side of cover 20 is a button 52 shown in FIGS. 1 and 2, in contact with a curved spring strip 54 anchored to chassis 22. Strip 54 may conveniently be an extension of one or other of springs strips 26 and 28. To the free end of strip 54 is attached a light spring wire 56 lying clear of the gear sector 44 when in its position of maximum rotation. When button 52 is pressed, spring wire 56 is adapted to press against gear sector 44 and return it towards and past its zero position. When pointer 38 reaches stop 74 any further movement of button 52 merely flexes spring 56, since it can move sector 44 no further.

To ensure that any scale reading reached by pointer 38 is retained until resetting is desired, small vee pulleys 66 and 68 are formed at the foot of pointer sleeve 40 and sector sleeve 48. Light spring wires 70 and 72 attached to chasis 22 are adapted to press slightly into pulleys 66 and 68 with the object to providing necessary friction and at the same time preventing sleeves 40 and 48 riding up on pillars 42 and 64. Necessary friction can be negligible in comparison with the force arising from mass 30 when first pointer movement occurs. Rod 30 may typically be 2.5 grams in weight, when the force generated by a swing yielding a notional 200 yards will be about 100 × g, or 250 grams. Calibration should accordingly be dependent for its permanence almost solely on the quality of the springs 26 and 28 that is employed.

The overall diameter of this accelerometer is typically 1½ inches. To make it smaller might undesirably reduce the legibility of the scale. The overall weight is typically 15 grams, so that when it is attached to a player's golf club the change in weight caused by the accelerometer with its fixings is generally unnoticed.

The depth of the accelerometer is typically 5/16th inches. This is a usual club shaft thickness, and since the accelerometer trails in the slip stream of the shaft, it adds little to the overall air drag. From its intended position it is protected by the club shaft from accidental direct contact with other objects in the course of being swung with the club.

Figure 6:
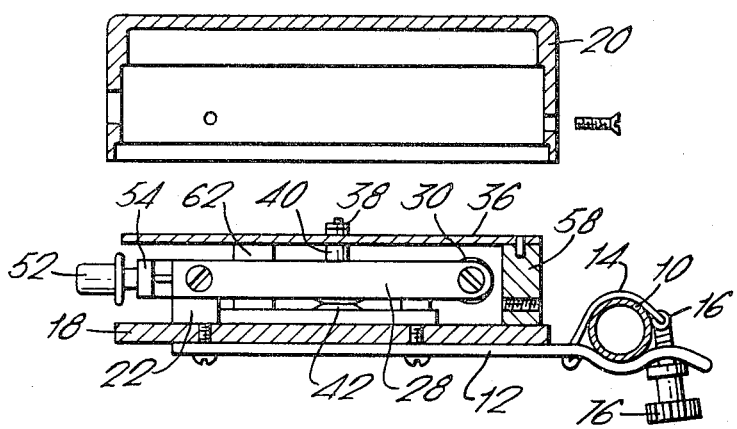
FIG. 6 shows an elevation of the accelerator shown in FIG. 5, with the cover lifted off its supports for clarity.

FIGS. 5 and 6 show a modified embodiment of the accelerometer according to the present invention. In these figures corresponding parts to the first embodiment are indicated by identical reference numerals and the explanation need not be made.

In this modified embodiment, the sector 44 of FIG. 1 is replaced by a Y shaped member 45 as shown in FIG. 5. The lower arm 45' of the Y shaped member 45 is formed by a spring having its spring force to outer side of the member 45. At between the tops of the two arms of the member 45, a string preferably made of nylon single wire is extended. The nylon string 46 is firmly extended under the action of the lower spring arm 45' of the Y shaped member 45 and wrapped around a sleeve 41 so that movement of the Y shaped member 45 resulting from a movement of the mass 30 causes rotation of the sleeve 41 by the frictional engagement between the nylon string 46. The rotation of the sleeve 41 shall turn the pointer 38 in the same manner of the case indicated in FIG. 1. The indication of the pointer 38 is kept in the position under action of spring wires 70 and 72.

The releasing of the indication pointer 38 is effected by pressing a button 52 and causing the end of spring 56 to press the Y shaped member 45 towards its original position.

In this embodiment a projection 24 is provided in the chassis 22 which engages with a projection 32 provided on the mass 30 so that the maximum movement of the mass 30 is restricted within a certain amount.

The modified embodiment has a feature of light weight construction and cheaper manufacturing cost.

What is claimed is:

1. An accelerometer, for the direct measurement of the velocity of the head of a golf club, comprising a chassis, means to connect the chassis to a golf club shaft; a single body of known mass mounted on the chassis by spring means for movement relative to and parallel to the golf club shaft against the action of the spring means; mechanical measuring and indicating means mounted on the chassis and adapted to measure and indicate the extent of any movement of the single body, over a predetermined minimum movement, relative to and parallel to the golf club shaft toward the golf club head, the spring means comprising two parallel, flat, spring strips each having one end connected to an individual end of the single body and the other end connected to the chassis, the measuring and indicating means comprising a scale mounted on the chassis; a pointer mounted on the chassis for rotary movement relative thereto with the free end of the pointer cooperating with the scale markings; and an arm mounted for movement with the body to cause rotation of the pointer relative to the chassis, the pointer being carried by a pinion gear which is meshed with a gear sector mounted on the chassis for engagement by the arm, whereby on movement of the arm the gear sector is rotated, which in turn rotates the pinion gear and thus the pointer, the measuring and indicating means including retaining means arranged to retain the measuring and indicating means in a position in which it is set by movement of the body relative to the chassis, and the retaining means comprising spring members bearing against pulleys disposed on sleeves embracing pillars, said pulleys mounted for rotation with the pinion gear and the gear sector, and for preventing the sleeves from riding up on the pillars.

2. An accelerometer, for the direct measurement of the velocity of the head of a golf club, comprising a chassis, means to connect the chassis to a golf club shaft; a single body of known mass mounted on the chassis by spring means for movement relative to and parallel to the golf club shaft against the action of the spring means; mechanical measuring and indicating means mounted on the chassis and adapted to measure and indicate the extent of any movement of the single body, over a predetermined minimum movement, relative to and parallel to the golf club shaft toward the golf club head, the spring means comprising two parallel, flat, spring strips each having one end connected to an individual end of the single body and the other end connected to the chassis, the measuring and indicating means comprising a scale mounted on the chassis; a pointer mounted on the chassis for rotary movement relative thereto with the free end of the pointer co-operating with the scale markings; and an arm mounted for movement with the body to cause rotation of the pointer relative to the chassis, the pointer being carried by a pinion gear which is meshed with a gear sector mounted on the chassis for engagement by the arm, whereby on movement of the arm the gear sector is rotated, which in turn rotates the pinion gear and thus the pointer, the measuring and indicating means including retaining means arranged to retain the measuring and indicating means in a position in which it is set by movement of the body relative to the chassis, including resetting means whereby the measuring and indicating means can be reset to a rest position after use of the accelerometer, and the resetting means comprising a button mounted for movement, relative to the chassis and in engagement with a spring arrangement arranged to engage the gear sector when out of its rest position, on movement of the button.

3. An accelerometer as claimed in claim 2, in which the chassis and the parts mounted thereon are mounted within a housing comprising a base and a detachable cover.

4. An accelerometer, for the direct measurement of the velocity of the head of a golf club, comprising a chassis, means to connect the chassis to a golf club shaft; a single body of known mass mounted on the chassis by spring means for movement relative to and parallel to the golf club shaft against the action of the spring means; mechanical measuring and indicating means mounted on the chassis and adapted to measure and indicate the extent of any movement of the single body, over a predetermined minimum movement, relative to and parallel to the golf club shaft toward the golf club head, wherein the spring means comprises two parallel, flat, spring strips each having one end connected to an individual end of the single body and the other end connected to the chassis, the measuring and indicating means comprising a scale mounted on the chassis; a pointer mounted on the chassis for rotary movement relative thereto with the free end of the pointer co-operating with the scale markings; and an arm mounted for movement with the body to cause rotation of the pointer relative to the chassis, the pointer being carried by a sleeve which is frictionally engaged with a string member extended between tops of arms of a Y shaped member mounted on the chassis for engagement by the arm, whereby on movement of the arm the Y shaped member is rotated, which in turn rotates the sleeve and thus the pointer.

* * * * *